Aug. 25, 1959  R. E. TIELENS  2,900,845
TRANSMISSIONS
Filed Oct. 11, 1954

INVENTOR.
Roger E. Tielens
BY
ATTORNEY

United States Patent Office 2,900,845
Patented Aug. 25, 1959

2,900,845

TRANSMISSIONS

Roger E. Tielens, Mexico City, Mexico, assignor to Rotary Engineering de Mexico, S.A., Mexico City, Mexico, a Federal corporation of Mexico Application October 11, 1954, Serial No. 461,323

6 Claims. (Cl. 74—688)

This invention relates to transmissions, and more particularly to hydromechanical transmissions which may be utilized as a driving element, such as for a vehicle.

In the conventional fluid coupling, which may also be termed a hydrodynamic coupling or hydraulic clutch, a pump or impeller, such as of the radial vane type, discharges directly into a fluid motor or runner which may be correspondingly equipped with radial vanes. The runner will tend to reach the speed of the impeller unless prevented from so doing by the load or total resistance to rotation of the runner, and the greater the load, the lower will be the resultant speed of the impeller. In such a fluid coupling, the efficiency is relatively high at full running load and full speed, the slip at such load and speed customarily amounting to only 3% to 5%. The hydraulic coupling runner will be reduced in speed as the load increases, and also is smooth in operation, thus minimizing sudden jerks and consequent possibility of causing parts to fail through repeated application of suddenly applied loads. However, as the speed of the runner relative to the impeller decreases, the drag torque or torque absorbed by the runner will increase, so that at relatively low speeds of the runner, when the impeller is still rotating at a much higher speed, which runner speeds correspond to relatively low speeds of a driven element, such as an output shaft driven from the runner, the drag torque with the runner stalled, or nearly stalled, ordinarily severely limits the range over which the advantages of a hydraulic coupling can be obtained. This is particularly true of power transmissions for vehicles. In the simpler types of hydraulic couplings, the fluid passes directly from the vanes of the impeller to the vanes of the runner and back again without any intervening parts. The drag torque characteristics at low speeds may be improved by placing a torus ring at the center of the runner and impeller assembly, with one-half of the ring mounted on the impeller and the other half on the runner. This ring provides a circular path for movement of the fluid between and through the impeller and runner. Other variations which have been used include a baffle plate extending around the inner lower edge of the runner, to restrict the flow of fluid from the runner back to the impeller, a deaeration chamber connected with the torus or ring half of the runner, and an eccentric runner circuit or an incomplete runner and impeller circuit, the purpose of the latter being to draw oil or hydraulic fluid from the working circuit under static conditions so as to reduce the amount of fluid being circulated. In addition, the shape of the circle, i.e., bounded by the outside of the ring and the inside of the impeller and runner chambers, has been varied so as to decrease the fluid space adjacent the outer periphery and increase the fluid space adjacent the inner periphery, thereby reducing the mean radius of reception of fluid by the impeller and increasing the mean radius of discharge of fluid by the impeller. See, for instance, "Practical Hydraulic Coupling Design Modifications," at page 66 of the Proceedings of the National Conference on Industrial Hydraulics, vol. 1, 1947. Nevertheless, such modifications do not sufficiently improve the hydraulic coupling, so that at lower speeds and heavy loads, the hydraulic coupling is much less efficient than would be desired and its use as a sole transmission element, particularly for vehicles which may require high torque at lower speeds, is therefore limited by its inherent characteristics.

The hydraulic torque converter, which consists essentially of a centrifugal or other type of pump discharging through a stator or line, to a hydraulic reaction turbine, with the turbine exhaust being led through the stator and back to the intake of the pump, has somewhat improved drag torque characteristics for stalling or lower speeds, and is therefore better adapted for use as a transmission for vehicles and the like, but is still less efficient than is desired at lower speeds. Nevertheless, such hydraulic torque convertors are used considerably in present-day automobile transmissions.

Gear systems for transmissions of vehicles have been used for a considerable period of time, and these systems are, in general, relatively highly efficient over a wide speed range. Planetary gear systems, which are one form of epicyclic gear train and which comprise a central or sun gear, an outer or ring gear, and a set of satellite gears which are mounted on a so-called spider and which rotate between the central gear and the ring gear, have been used to various extents in vehicle transmissions. If the spider and satellite gears are permitted to rotate freely, when the ring gear is connected to the driven element, the ring gear will be rotated at substantially the same speed as the central gear, which is connected to the driving shaft. However, if the satellite gear spider is braked, or stopped, or is attached to a stationary part, such as the housing which enclosed the planetary gear system, a speed reduction will occur and a mechanical advantage will be obtained, depending upon the relative diameter and the number of teeth in the central gear and ring gear, with the result that the driven shaft will rotate at a considerably lower speed than the driving shaft, but with relatively high power transmission efficiency at low speeds of the driven element or shaft. However, to change from substantially free rotation of the satellite gear spider to rotation thereof at a slow speed, or to stop the spider, requires some sort of braking mechanism, the types previously utilized being brake bands which tend to wear out frequently, require considerable force for application and produce objectionable noise and vibration. Similar observations may be made with respect to the system in which the spider is connected to the driven element and the ring gear is braked. Thus, while a planetary gear system was used exclusively prior to 1930 in one popular type of automobile, the planetary gear system was even in that automobile replaced by a transmission in which the gears were mounted on parallel shafts and shifted either manually or automatically. Hydraulic torque converters have been used to a considerable degree more recently, often preceding a planetary gear system or a gear system in which the gears are mounted on parallel shafts and various gears are shifted into and out of engagement to provide greater and lesser degrees of speed reduction. Nevertheless, such torque converter transmissions leave much to be desired, particularly with respect to their efficiency and power transmission at starting and low speeds.

Among the objects of the present invention are to provide a novel transmission; to provide a transmission in which advantage is taken of the speed reduction and power transmission efficiency of a planetary gear system and also the smooth operation of the hydraulic coupling; to provide such a transmission in which the relatively low efficiency of the hydraulic coupling at low speeds is overcome; to provide such a transmission in which the speed reduction produced by a planetary gear system is automatically varied in accordance with the torque or load resistance; to provide such a transmission in which the hydraulic coupling and planetary transmission may be interconnected for cooperation together in a compact but relatively uncomplicated assembly; to provide such a transmission which is particularly adapted for use in the hub of a rear or drive wheel for a motorcycle, bicycle or the like; to provide such a transmission which has few parts which tend to wear and in which adequate lubrication of all parts may be assured; and to provide such a transmission which is readily manufactured and assembled, and is also efficient and effective in use.

Additional objects and the novel features of this invention will become apparent from the description which follows, taken in connection with the accompanying drawings, in which.

Figure 1:
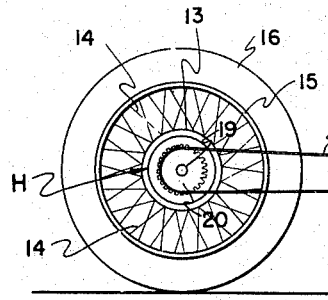
Fig. 1 is a side elevation of the rear wheel of a motorcycle or bicycle, in the hub of which is installed a transmission constructed in accordance with this invention and forming one embodiment thereof.
Figure 2:
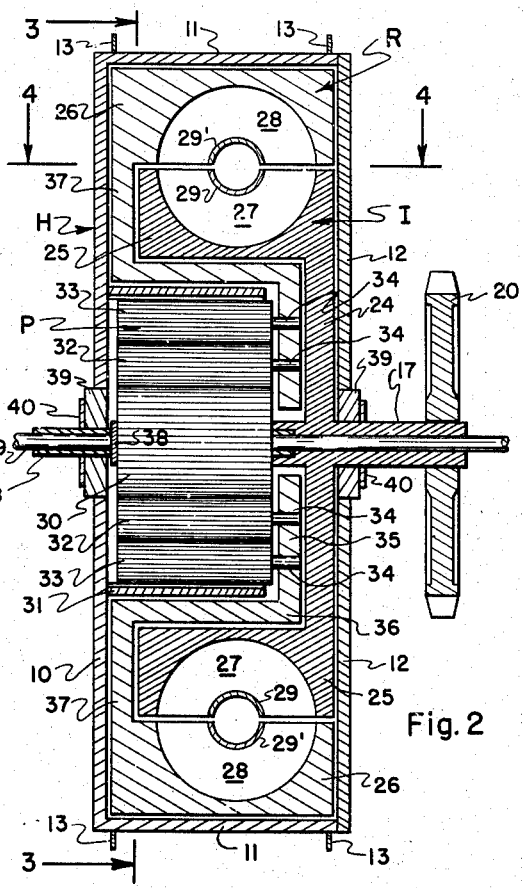
Fig. 2 is an axial cross section, on an enlarged scale, of the transmission and hub of Fig. 1.

As illustrated in Figs. 1 and 2, a transmission constructed in accordance with this invention may be enclosed within a hub or housing H, which simultaneously forms a hub for the rear wheel of a bicycle, motorcycle, or the like, and a housing for the transmission. The housing H is cylindrical, and may be divided into two or more connected parts, such as an annular plate 10 provided with a cylindrical flange 11 around its outer periphery and closed at the opposite end by an annular plate 12, which may be attached around its outer edges to the end of flange 11 by bolts or in any other suitable manner. The flange 11 may be provided with a pair of axially spaced, radial flanges 13, to which the inner ends of wire spokes 14 may be attached with the outer ends of the spokes 14 being attached to a rim 15, the inner and outer ends of the spokes 14 being attached to the flanges 13 and rim 15, respectively, in any desired conventional manner. A pneumatic tire 16 may be mounted on the rim 15, as is customary in wheels of this type. For rotation, the wheel may be mounted at one side on a shaft 17 and at the opposite side on a counter shaft 18, shafts 17 and 18 being rotatable on a fixed shaft 19, conveniently mounted on the conventional rear fork of the motorcycle or bicycle frame. The shaft 17 constitutes the driving element and is therefore provided with a sprocket 20 adapted to be driven by a chain 21 from the motor or other source of power. If desired, ball or roller bearings may be interposed between fixed shaft 19 and shafts 17 and 18.

Figure 4:
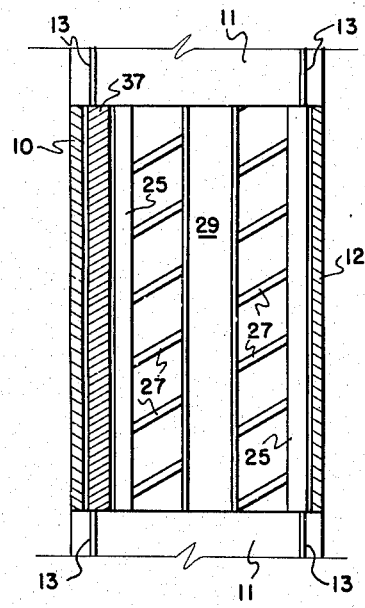
Fig. 4 is a fragmentary arcuate section, taken at the position of line 4—4 of Fig. 2.
Figure 3:
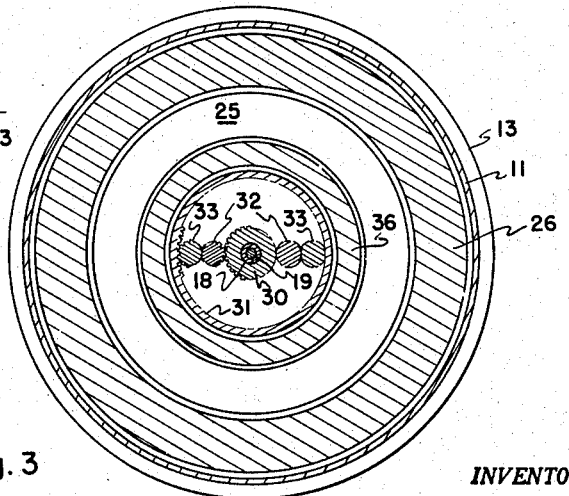
Fig. 3 is a vertical section, taken along line 3—3 of Fig. 2 and shown on a reduced scale.

In accordance with this invention, the shaft 17 is connected to, or may be formed integrally with, an impeller I of a hydraulic coupling, the impeller I being adapted to drive a runner R. The impeller I includes a radial plate or flange 24 provided around its outer periphery with a cylindrical block 25 and the runner R is similarly provided around its outer periphery with a cylindrical block 26 which is disposed radially outwardly from block 25. A toroidal space is machined or otherwise formed in the blocks 25 and 26, with one-half of the space in each block and the space halves in opposed positions. A series of vanes 27 are mounted in angularly extending positions and at equally spaced points around the periphery of the space in block 25, as in Fig. 4, while a similar series of vanes 28 are mounted in the space in block 26 and at corresponding equally spaced positions around the periphery of the runner R. Thus, when the impeller I is rotated, fluid contained within the spaces between the vanes 27 will be pumped into the spaces between the vanes 28, thereby tending to drive the runner R in the same direction and at the same speed as the impeller I. Of course, the runner R will be driven at the same speed only if there is no load resisting rotation of the runner R, although the impeller and runner may be so designed that at full load and at rated speed, the slip or difference between the speed of rotation of the runner will be only about 3% to 5% less than that of the impeller I. In order to direct the fluid flow more accurately, a ring consisting of two halves 29 and 29' may occupy the central portion of the toroidal space within the blocks 25 and 26, the half rings 29 and 29' conveniently being attached to the vanes 27 and 28, as will be evident from Fig. 4. The vanes 27 and 28 may extend at any appropriate angle with respect to the axis of impeller I and runner R.

In further accordance with this invention, the hydraulic coupling consisting of the impeller I and the runner R is also connected with a planetary gear system P, which is enclosed within the housing H and includes a central or sun gear 30, an outer or ring gear 31, and a dual set of satellite gears including inner gears 32 and outer gears 33. The teeth of ring gear 31 may be machined in a flange extending inwardly from and formed integrally with or attached, as by welding, to the plate 10 of housing H, while the sets of satellite gears are disposed at equally spaced positions around the central gear 30.

In further accordance with this invention, there are dual satellite gears, so that ring gear 31 and hub H will be rotated in the same direction as central gear 30 and drive shaft 17, and for additional reasons, as pointed out hereinafter. Each gear 32 and 33 is mounted on a shaft 34 which extends in a direction parallel to the axis of shaft 17 from a "spider" or "arm," which is driven by the runner R of the hydraulic coupling, the spider being conveniently formed as a radial flange 35 which extends inwardly from one end of a tangential flange 36, the latter being connected at its opposite end by a radial flange 37 with the block 26, thereby forming a space for block 25 of impeller I. The flanges 35, 36 and 37 may be formed integrally together and/or with block 26, or may be formed as separate parts which are welded or otherwise attached to each other and to the block 26. As will be evident, as the runner R is rotated by the impeller I, the spider or radial flange 35 carrying the satellite gears 32 or 33 will also tend to be rotated in the same direction. The central gear 30 is preferably mounted on and driven directly by the driving element or shaft 17 and the counter shaft 18 may, therefore, extend into the shaft 17 and be attached thereto as by threading over a portion of its length, and the shaft 18 further may be provided with a flange 38 which holds the central gear 30 in position.

As will be evident, the ring gear 31 rotates the driven element, which in this case is the housing H, forming the hub of the wheel. In order to permit housing H to rotate freely with respect to shafts 17 and 18, and to seal the fluid, which may be an oil selected for adequate lubrication properties so as to lubricate the planetary gears, as well as for its use as a hydraulic fluid in the hydraulic coupling formed by the impeller I and runner R, the plates 10 and 12 may be provided with bearings 39 at their inner peripheries, the bearings 39 engaging the shafts 17 and 18, respectively. Also, each bearing 39 may be provided with a sealing ring 40, which may be formed of neoprene or any other suitable type of flexible, hydrocarbon resistant material. Of course, other types of seals than those indicated by the rings 40 may be utilized, such as types in which the seal rings are sufficiently flexible that an annularly extending lip is formed by each, around which a coil spring may be placed, such lip and spring being enclosed by a dust housing, if desired. However, since the present invention contemplates no more than conventional or available seals, the seal rings 40 are shown quite simply, merely to indicate that a seal at these points is desirable.

The manner in which a transmission constructed in accordance with this invention operates to secure the advantage of the efficiency of transmission of a planetary gear system at low speeds and also to secure the flexibility and automatic speed regulation in accordance with the load of a hydraulic coupling, will now be explained. It will be evident that the ring gear 31 is directly connected to the driven element or housing H and that therefore the speed of rotation of the driven element will be identical with that of the ring gear 31; that central gear 30 is directly connected to the driving element, i.e., mounted on the drive shaft 17, and its speed will be identical with that of the driving element; and that the flanges 35, 36 and 37 are mounted on or part of the runner R of the hydraulic coupling, so that the speed of rotation of the spider or mount for the satellite gears will be identical with that of the runner of the hydraulic coupling.

Assume that the driving element, i.e., the shaft 37 is rotated at a constant speed of 1,000 r.p.m., although this speed will, of course, vary for different engine speeds, but substantially the same ratios will hold true for any other speed with respect to the relative speeds of the various parts. It is also assumed that the ratio between the number of teeth on the ring gear 31 and the central gear 30, is 4 to 1, although such speed ratio may be different. Also, it is assumed that the resistance of the load is such that the hydraulic coupling impeller, which is also rotating at 1,000 r.p.m., cannot turn the runner, but that as the central gear 30 rotates, the satellite gears are rotated bodily at 250 r.p.m. in the opposite direction, or what may be considered —250 r.p.m. This requires that the runner R, in effect, be rotated at 250 r.p.m. in the opposite direction to impeller I by the central gear 30 and satellite gears, but the mechanical advantage of the central gear and satellite gears will also tend to turn the ring gear 31. In addition, rather than tending to reduce the torque transmitted through the satellite gears to the ring gear, the resistance to rotation by the impeller will in fact tend to slow rotation in the reverse direction, and produce the normal starting condition, wherein the flange 35 is standing still and the ring gear 31 is driven at 250 r.p.m., i.e., one-fourth of the speed of the central gear 30 and drive shaft 17. At this time, since the drive to ring gear 31 through central gear 30 and satellite gears 32 and 33 is direct, the proportion of the torque transmitted through the gears exceeds considerably the torque transmitted through the hydraulic coupling, since the "slip" of the latter is not then dependent on the torque transmitted but rather on only the resistance necessary to keep the satellite gears, as a unit, from turning in the reverse direction. As will be evident, at low speeds the hydraulic coupling acts as a brake for the satellite gears, thus enabling the full mechanical advantage of the planetary gears and a high starting torque to be obtained. As the speed of the ring gear 31 increases, the hydraulic coupling will tend to rotate the satellite gears, as a unit, at increasing speeds until they reach the same speed of rotation as the central gear 63, or 1,000 r.p.m. (neglecting the slight slippage at full speed and the full load), and the ring gear, or driven element, will therefore also rotate at 1,000 r.p.m. In this condition, the satellite gears 32 and 33 will not rotate individually about their shafts 34, but the central gear, satellite gears and ring gear will rotate as a unit, thereby providing a direct drive through which a proportion of the total torque will be transmitted, with the remainder transmitted through the hydraulic coupling.

Considered from another standpoint, when the satellite gear mounts are stationary, the mechanical advantage between the central gear and the ring gear is 4 to 1, i.e., the gear ratio between the central and ring gears, and this decreases between this condition and the condition when the satellite gears rotate at the same speed as the central gear, when the speed ratio and mechanical advantage is approximately 1 to 1. However, when the satellite gear mounts are rotating in the opposite direction, the mechanical advantage is greater than 4 to 1, and a comparatively large torque is transmitted at low speeds through the planetary gears. It will therefore be evident that, at low speeds, the small amount of torque transmitted by the hydraulic coupling is an advantage, rather than a disadvantage, and the speed of the ring gear 31 will, in effect, be automatically regulated by the hydraulic coupling, in accordance with torque resistance of the driven element. Also, the changes in speed ratio of the planetary gear system will be smooth and not jerky, since the fluid flow in the hydraulic coupling will avoid any jerkiness in changing from one speed to another or from one mechanical advantage to another.

Considering next the starting conditions of a vehicle, such as a motorcycle, or the like, driven by an internal combustion engine which is capable of idling speed and acceleration to higher speeds, assume that the speed of the driving element is relatively low, that is, idling speed of the engine. At such low speeds, the resistance to rotation of the ring gear 31 may be sufficient to prevent rotation thereof. However, as the engine is accelerated from idling speed, the mechanical advantage of the planetary gear system will readily start the vehicle, and the speed of the engine will readily increase, due to the same mechanical advantage. As the speed further increases, the engine will reach 1,000 r.p.m., say and the condition when the satellite gear supports are stationary will be produced. Also, as long as the torque required, either for acceleration or for traveling uphill or the like, is high, the satellite gears, as a unit, will tend to lag behind, due to slowing of the runner of the hydraulic coupling, and during acceleration or at heavy loads, the planetary gears will transmit such torque at a mechanical advantage greater than 1 to 1, and this is available over substantially the entire range of speed of the engine.

The necessity of using dual satellite gears will now be evident, since the transmission is considerably simplified by mounting both the hydraulic coupling impeller and the planetary central gear on the same shaft, and the driven element may therefore be rotated in the same direction as the driving element. This is particularly advantageous in the case of the motorcycle drive illustrated in Fig. 1. Also, the runner of the hydraulic coupling will tend to be rotated in the same direction as the impeller, and normal rotation of the satellite gear mount in the same direction is desirable, since the drag of the coupling at low speeds can be utilized to advantage in slowing the satellite gear mounts to take full advantage of the planetary gears. The attachment of both the central and the hydraulic coupling impeller also provides a more compact, but less complicated assembly.

To recapitulate briefly, the power transmitted from the driving element to the driven element at low speeds is not dependent on the drag torque characteristics of the hydraulic coupling, but rather on direct transmission through the planetary gear system. Furthermore, at low speeds the high drag torque of the hydraulic coupling is advantageous, since it will reduce the speed of the runner and tend to bring the satellite gears to a stationary position wherein normal mechanical advantage of the planetary gear system can be obtained. Also, as the speed increases, part of the power is transmitted through the hydraulic coupling until when the satellite gears reach the full speed of the driving element, or as close thereto as slippage in the hydraulic coupling will permit, the power to the driven element is transmitted not only through the planetary gear system, but also through the hydraulic coupling. In addition, the smoothness in operation of the hydraulic coupling is employed to bring the mechanical advantage of the planetary gear system into play as the load increases, and the driven element tends to slow down. In other words, the hydraulic coupling automatically increases the proportion of the load that is carried by the planetary gear system as the load increases.

A transmission constructed in accordance with this invention may be made in any one of several different ways, as will be evident to those skilled in the art. Thus, the impeller and runner of the hydraulic coupling may be made by casting or machining to form the vanes, and with the rings being either cast in place or stamped from sheet metal, and then welded or otherwise attached in position. The gears, of course, may be made in the usual manner, and the ring gear of Fig. 1 may be first machined and then welded to the housing, or may be removably attached to the housing by bolts, or the like. The housings may be made of sheet metal or plate of suitable thickness, with parts stamped and cut to desired shapes and dimensions, and then welded or otherwise suitably attached together, or the housing parts may be formed by casting or similar procedures. It will be observed that the satellite gears may support the runner of the hydraulic coupling for rotation, so that bearings for the hydraulic coupling runner may be unnecessary. However, bearings may be provided, if desired, and particularly thrust plates or bearings to restrict or limit endwise movement of the satellite gears and runner.

Although one embodiment of this invention has been illustrated and described, and certain variations therein indicated, it will be understood that other embodiments may exist, and various changes made therein, all without departing from the spirit and scope of this invention.

What is claimed is:

1. A transmission for a motorcycle and the like having a power actuated wheel, comprising a housing forming a hub for said wheel; a drive shaft extending axially into said housing; a radial plate carrying an annular hydraulic coupling impeller at its periphery and mounted on said drive shaft within said housing; a central gear of a planetary gear system mounted on said drive shaft within said housing and in axially spaced relation with respect to said plate and radially inwardly from said impeller; a ring gear attached to said housing and disposed radially inwardly of said impeller; an annular hydraulic coupling rotor within said housing and mounted in operative relation with respect to said impeller; and at least two sets of dual satellite gears mounted on said rotor, the inner gear of each set of satellite gears engaging said central gear and the outer gear of each set of satellite gears engaging said ring gear.

2. A transmission for a motorcycle and the like, as defined in claim 1, wherein a counter shaft extends into said housing from the side opposite said drive shaft and interengages said drive shaft.

3. A transmission for a motorcycle and the like, as defined in claim 1, wherein said impeller and rotor are provided with semi-annular spaces, in circumferential juxtaposition to form a generally annular fluid space, said impeller and rotor spaces having vanes therein.

4. A transmission for a motorcycle and the like, as defined in claim 1, wherein said rotor surrounds said impeller.

5. A transmission for a motorcycle and the like, as defined in claim 4, wherein said rotor is provided with a flange having an axially extending portion adjacent the outer periphery of said ring gear and an inwardly extending portion on which said satellite gears are mounted.

6. A transmission for a motorcycle and the like having a power actuated wheel, comprising a housing forming a hub for said wheel, said housing having an annular outer wall and radial side walls and provided with means for connecting wheel spokes to the annular outer wall thereof; a drive shaft extending axially into said housing at one side; a hydraulic coupling impeller mounted on said drive shaft within said housing, said impeller including a radial flange adjacent said one side of said housing and an integral cylindrical block extending axially from the outer periphery of said flange and in a direction away from said one side of said housing, said block having a generally semi-annular space formed in its outer surface and angularly extending vanes in spaced relation around said space; a central gear of a planetary system mounted on said drive shaft within said housing and in axially spaced relation with respect to said impeller flange; a ring gear of said planetary gear system attached to the side wall of said housing opposite said impeller flange and with the inner end thereof spaced from said impeller flange; a hydraulic coupling rotor within said housing and in operative relation with respect to said impeller, said rotor including an inner radial flange in the space between said impeller flange and the ends of said central gear and ring gear, an axial flange disposed between said ring gear and said impeller block, an outer radial flange disposed between the end of said impeller block and said opposite side wall of said housing, and a cylindrical block disposed between said impeller block and the outer wall of said housing, said inner radial flange, axial flange, outer radial flange and said block being integral and said block having a semi-annular space around its inner surface directly opposite said impeller space and provided with angularly extending vanes in spaced relation therearound; at least two sets of pins mounted on said rotor inner flange, each set including two pins in radial alignment and extending axially into the space between said central gear and said ring gear; at least two sets of dual satellite gears mounted for rotation on said rotor pins, the inner gears of each set engaging said central gear and the outer gears of each set engaging said ring gear; a counter shaft extending axially into said housing from said opposite side thereof and provided with an abutment for the end of said central gear, said drive shaft being counterbored to receive said counter shaft; and fluid seals mounted on said housing and extending around each of said drive shaft and said counter shaft.

References Cited in the file of this patent

UNITED STATES PATENTS

| | | |
|---|---|---|
| 1,242,974 | Pinckney | Oct. 16, 1917 |
| 2,385,059 | Buthe | Sept. 18, 1945 |
| 2,637,219 | Stewart | May 5, 1953 |